(12) United States Patent
Li et al.

(10) Patent No.: US 6,707,960 B2
(45) Date of Patent: Mar. 16, 2004

(54) REFLECTION TYPE COMPACT OPTICAL SWITCH

(75) Inventors: Yiqiang Li, San Jose, CA (US); Yongjian Wang, Saratoga, CA (US)

(73) Assignee: AC Photonics, Inc., Santa Clara, CA (US)

( * ) Notice: Subject to any disclaimer, the term of this patent is extended or adjusted under 35 U.S.C. 154(b) by 85 days.

(21) Appl. No.: 10/051,966

(22) Filed: Jan. 15, 2002

(65) Prior Publication Data

US 2003/0099430 A1 May 29, 2003

Related U.S. Application Data

(60) Provisional application No. 60/333,787, filed on Nov. 28, 2001.

(51) Int. Cl.[7] .............................. G02B 6/26; G02B 6/35
(52) U.S. Cl. .............................. 385/18; 385/16; 385/22; 385/24; 385/31; 385/33; 385/34
(58) Field of Search .................. 385/16, 18, 22, 385/24, 31, 33, 34, 35

(56) References Cited

U.S. PATENT DOCUMENTS 6,219,474 B1 * 4/2001 Cai et al. .................. 385/24
6,463,189 B1 * 10/2002 Wu et al. .................. 385/16
6,477,289 B1 * 11/2002 Li .............................. 385/16
6,493,139 B1 * 12/2002 Liu et al. .................. 359/484

FOREIGN PATENT DOCUMENTS

| JP | 10039142 A | * 2/1998 | ........... G02B/06/00 |
| JP | 2001272612 A | * 10/2001 | ........... G02B/26/08 |

* cited by examiner

*Primary Examiner*—John D. Lee
*Assistant Examiner*—Daniel Valencia
(74) *Attorney, Agent, or Firm*—Sawyer Law Group LLP

(57) ABSTRACT

A method and system for providing an optical switch is described. The method and system include providing a triple fiber collimator, a beam deflector and a reflector. The triple fiber collimator is for receiving an optical signal from a first fiber and outputting the optical signal to a second fiber or a third fiber. The beam deflector has a first portion and a second portion. The beam deflector resides between the reflector and the triple fiber collimator. The optical signal travels through the first portion of the beam deflector, is reflected by the reflector and is output over the second fiber when the beam deflector is in a first position. The optical signal travels through the second portion of the beam deflector, is reflected by the reflector and is output over the third fiber when the beam deflector is in a second position.

14 Claims, 7 Drawing Sheets

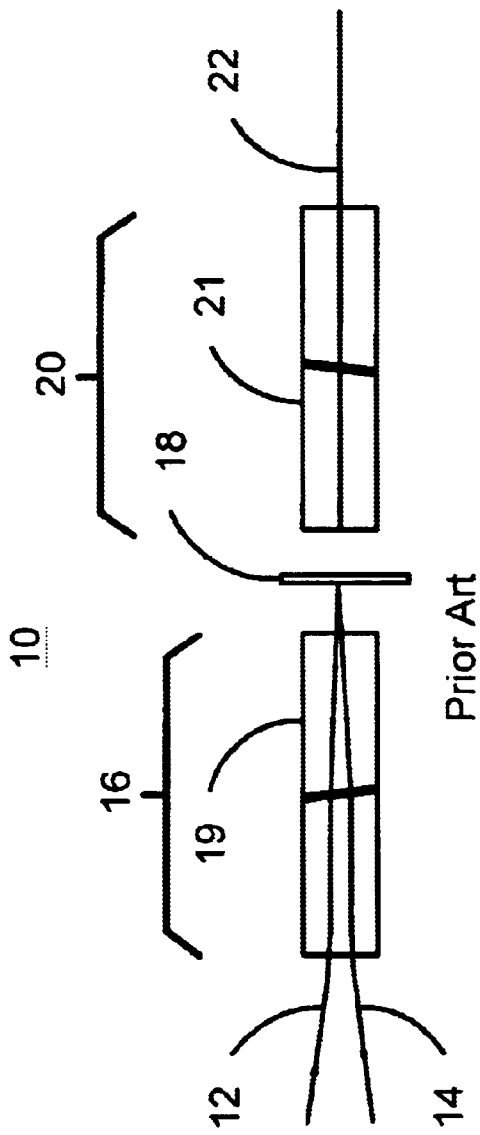
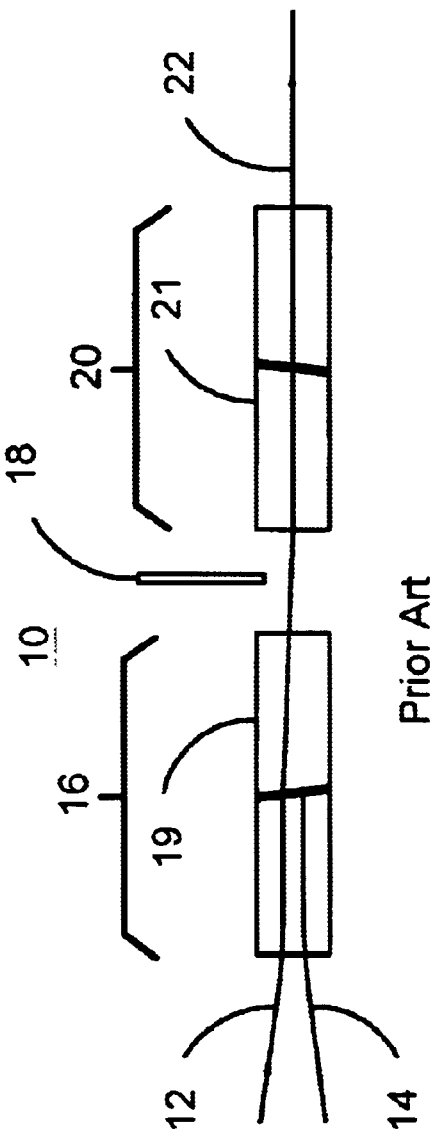
Prior Art
Figure 1A
Prior Art
Figure 1B

REFLECTION TYPE COMPACT OPTICAL SWITCH

CROSS-REFERENCE TO RELATED APPLICATION

This application is claiming under 35 U.S.C. §119(e) the benefit of provisional patent application No. 60/333,787, filed on Nov. 28, 2001.

FIELD OF THE INVENTION

The present invention relates to optical systems, and more particularly to a method and system for providing a compact optical switch.

BACKGROUND OF THE INVENTION

In fiber optic communication, a particular optical signal may be desired to be provided on of two possible paths. Under one set of conditions, the optical signal is provided to a particular fiber. Under a different set of conditions, the optical signal will be provided to a different optical fiber. In order to do perform these functions, an optical switch, such as a conventional 1×2 optical switch, is used. FIGS. 1A and 1B depict a conventional optical switch 10. The conventional optical switch 10 includes a dual fiber collimator 16 that is coupled to fibers 12 and 14, a mirror 18 and a single fiber collimator 20 that is coupled to a single fiber 22. The dual fiber collimator 16 is typically utilizes a GRIN lens 19.

The conventional optical switch 10 can output an optical signal input via fiber 12 on either the fiber 14 or the fiber 22. In the first configuration, depicted in FIG. 1A, the optical signal input on the fiber 12 is reflected off of the mirror 18 and back to the output fiber 14. Thus, the optical signal will be output along Fiber 14. In the second configuration, depicted in FIG. 1B, the mirror 18 has been moved so that the mirror 18 no longer intersects the path of the optical signal. As a result, the optical signal input over the fiber 12 passes through the single fiber collimator 20 and is output via the fiber 22.

Although the conventional optical switch 10 functions, one of ordinary skill in the art will readily recognize that very precise alignment of the components is required for this conventional optical switch 10. In particular, the alignment of the mirror 18 is critical to ensuring that when the conventional optical switch 10 is in the configuration depicted in FIGS. 1A, the optical signal reflected off of the mirror 18 is provided to the fiber 14. Typically, a mechanical pivot is used to move the mirror 18 between the positions shown in FIGS. 1A and 1B. During repeated use, the mechanical pivot typically becomes worn. As a result, the alignment of the mirror 18 may be altered. The insertion loss for the conventional optical switch 10 may thus increase dramatically.

Accordingly, what is needed is an optical switch which allows for less precise alignment. The present invention addresses such a need.

SUMMARY OF THE INVENTION

The present invention provides method and system for providing an optical switch. The method and system include providing a triple fiber collimator, a beam deflector and a reflector. The triple fiber collimator is for receiving an optical signal from a first fiber and outputting the optical signal to a second fiber or a third fiber. The beam deflector has a first portion and a second portion. The beam deflector resides between the reflector and the triple fiber collimator. The optical signal travels through the first portion of the beam deflector, is reflected by the reflector and is output over the second fiber when the beam deflector is in a first position. The optical signal travels through the second portion of the beam deflector, is reflected by the reflector and is output over the third fiber when the beam deflector is in a second position.

According to the system and method disclosed herein, the present invention provides an optical switch that requires less precise alignment.

BRIEF DESCRIPTION OF THE DRAWINGS

FIG. 1A is a diagram of a conventional optical switch when the optical signal is output over a first fiber.

FIG. 1B is a diagram of a conventional optical switch when the optical signal is output over a second fiber.

DETAILED DESCRIPTION OF THE INVENTION

The present invention relates to an improvement in optical switch. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention provides method and system for providing an optical switch. The method and system include providing a triple fiber collimator, a beam deflector and a reflector. The triple fiber collimator is for receiving an optical signal from a first fiber and outputting the optical signal to a second fiber or a third fiber. The beam deflector has a first portion and a second portion. The beam deflector resides between the reflector and the triple fiber collimator. The optical signal travels through the first portion of the beam deflector, is reflected by the reflector and is output over the second fiber when the beam deflector is in a first position. The optical signal travels through the second portion of the beam deflector, is reflected by the reflector and is output over the third fiber when the beam deflector is in a second position.

The present invention is described in terms of particular components. However, one of ordinary skill in the art will readily recognize that the system and method are consistent with other components having similar functions.

Furthermore, portions of the present invention are described as parallel or perpendicular. However, one of ordinary skill in the art will readily recognize that these portions are substantially parallel or substantially perpendicular.

Figure 2:
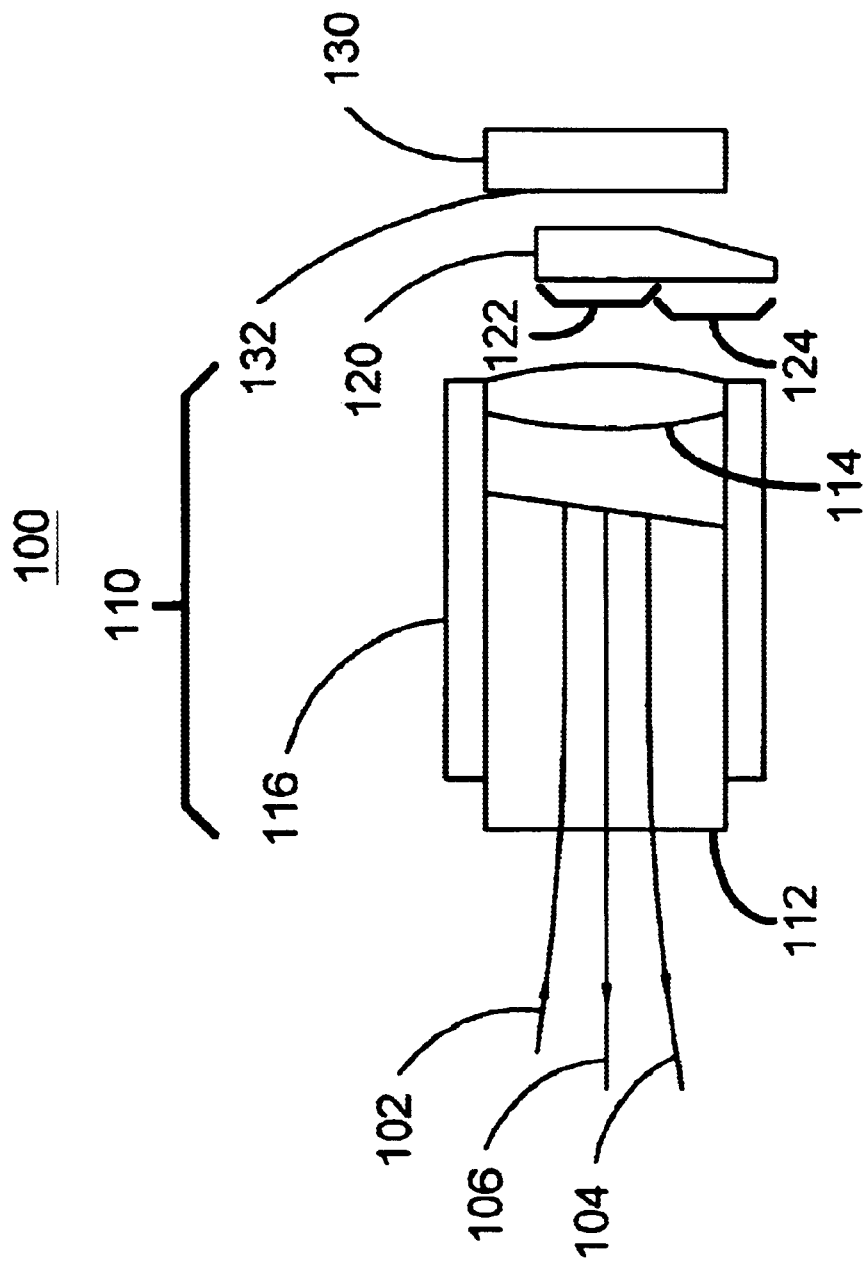
FIG. 2 is a diagram of one embodiment of an optical switch in accordance with the present invention.

To more particularly illustrate the method and system in accordance with the present invention, refer now to FIG. 2, depicting one embodiment of an optical switch 100 in accordance with the present invention in a first configuration. The optical switch 100 includes a triple fiber collimator 110, a beam deflector 120 and a reflector 130. The triple fiber collimator 10 is coupled with three fibers 102, 104 and 106. The triple fiber collimator 110 includes a triple fiber capillary 112, a lens 114 and a glass tube 116. The lens 114 is preferably a cylindrical shaped C-lens (manufactured by Koncent Communication, Inc., Fuzhou, P.R.China) or an aspherical lens. The mirror 130 includes a high reflection coating 132 for reflecting an optical signal. The beam deflector includes two portions. The first portion 122 of the beam deflector 120 has parallel faces, while the second portion 124 of the beam deflector 120 has faces that are angled.

An optical signal is input to the optical switch 100 using the input fiber 102. The triple fiber collimator 110 collimates the optical signal and provides the optical signal to the beam deflector 120. The beam deflector 120 deflects the optical signal and provides the optical signal to the mirror 130. Depending upon the position of the beam deflector 120, the optical signal will be transmitted through a different portion 122 or 124 of the beam deflector 120 and reflected off of the mirror 130. The reflected optical signal will be output via the fiber 104 or 106, depending upon the position of the beam deflector 120.

To more particularly describe the operation of the optical switch 100, preferred embodiments of the triple fiber collimator 10 and the combination of the triple fiber collimator 110, the beam deflector 120 and the mirror 130 are separately described below.

Figure 3:
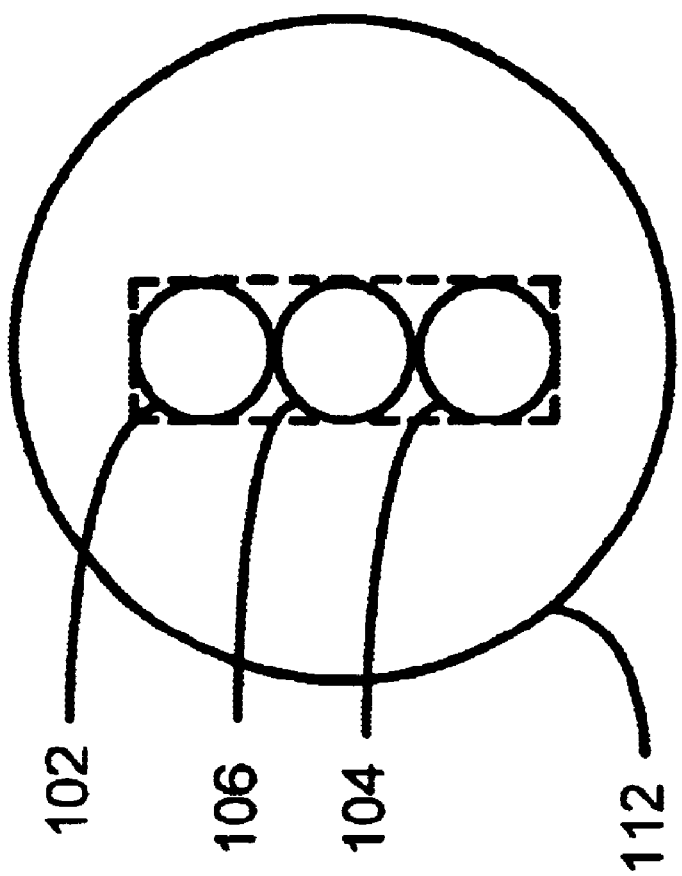
FIG. 3 is an end view of one embodiment of a triple fiber pigtail capillary in accordance with the present invention.

FIG. 3 is an end view of one embodiment of a triple fiber pigtail capillary 112 in accordance with the present invention. The triple fiber pigtail capillary 112 holds the fibers 102, 104 and 106. The triple fiber pigtail capillary 112 is preferably holds the fibers 102, 104 and 106 such that the fibers 102, 104 and 106 are aligned vertically. The fibers 102, 104 and 106 are preferably single mode fibers.

Figure 4:
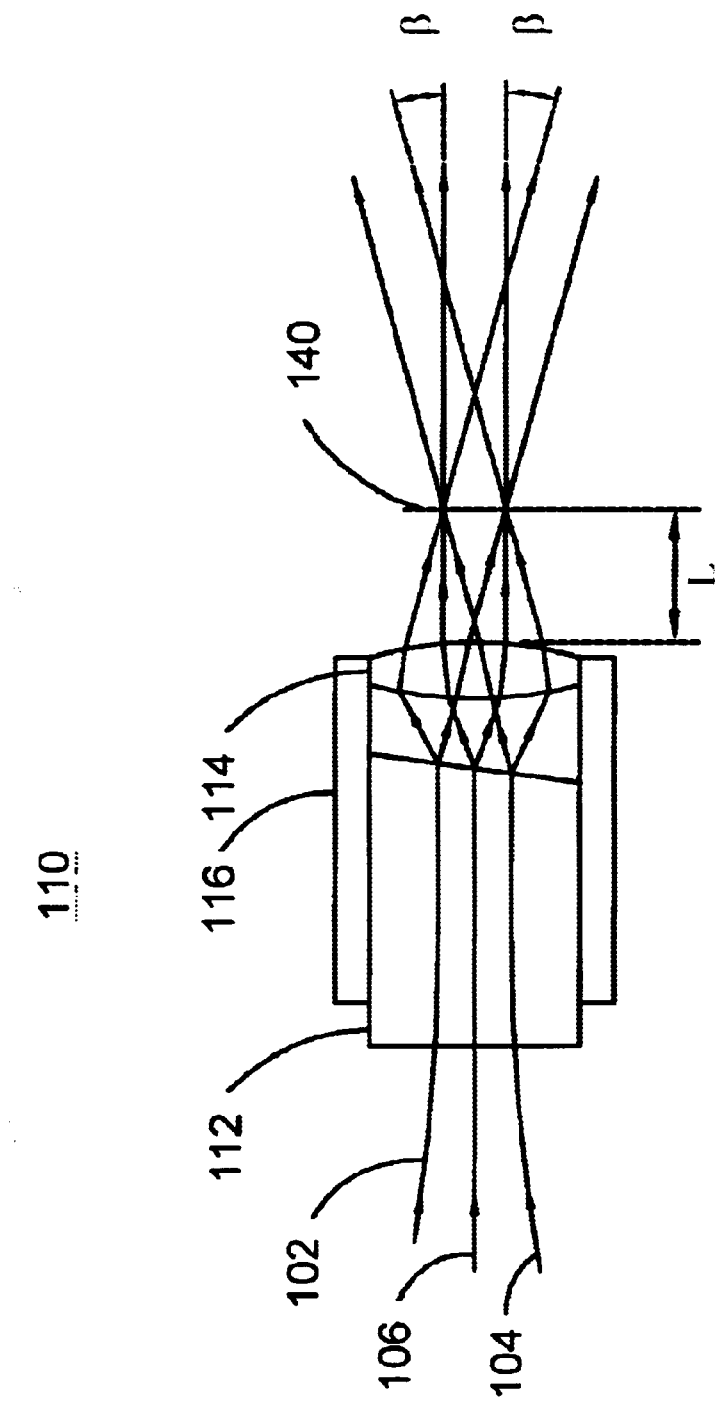
FIG. 4 depicts a side view of one embodiment of the triple fiber collimator in accordance with the present invention.

FIG. 4 depicts a side view of one embodiment of the triple fiber collimator 110 in accordance with the present invention. In operations, the triple fiber collimator 110 collimates the optical signal input via the fiber 102. Furthermore, the triple fiber collimator 110 will also collimate optical signals input over the fibers 104 and 106. The optical signals from the fibers 102, 104 and 106 are collimated such that they will cross at the cross plane 140. The cross plane 140 is separated from the closest point of the front surface (closest to the beam deflector) of the lens 114 by a crossing distance, L, having a typical value of 2~3 mm. Furthermore, the three collimated optical signals from collimator 110 are separated from each other by a beam separation angle, β, which is generally between 2° and 4°.

Figure 5:
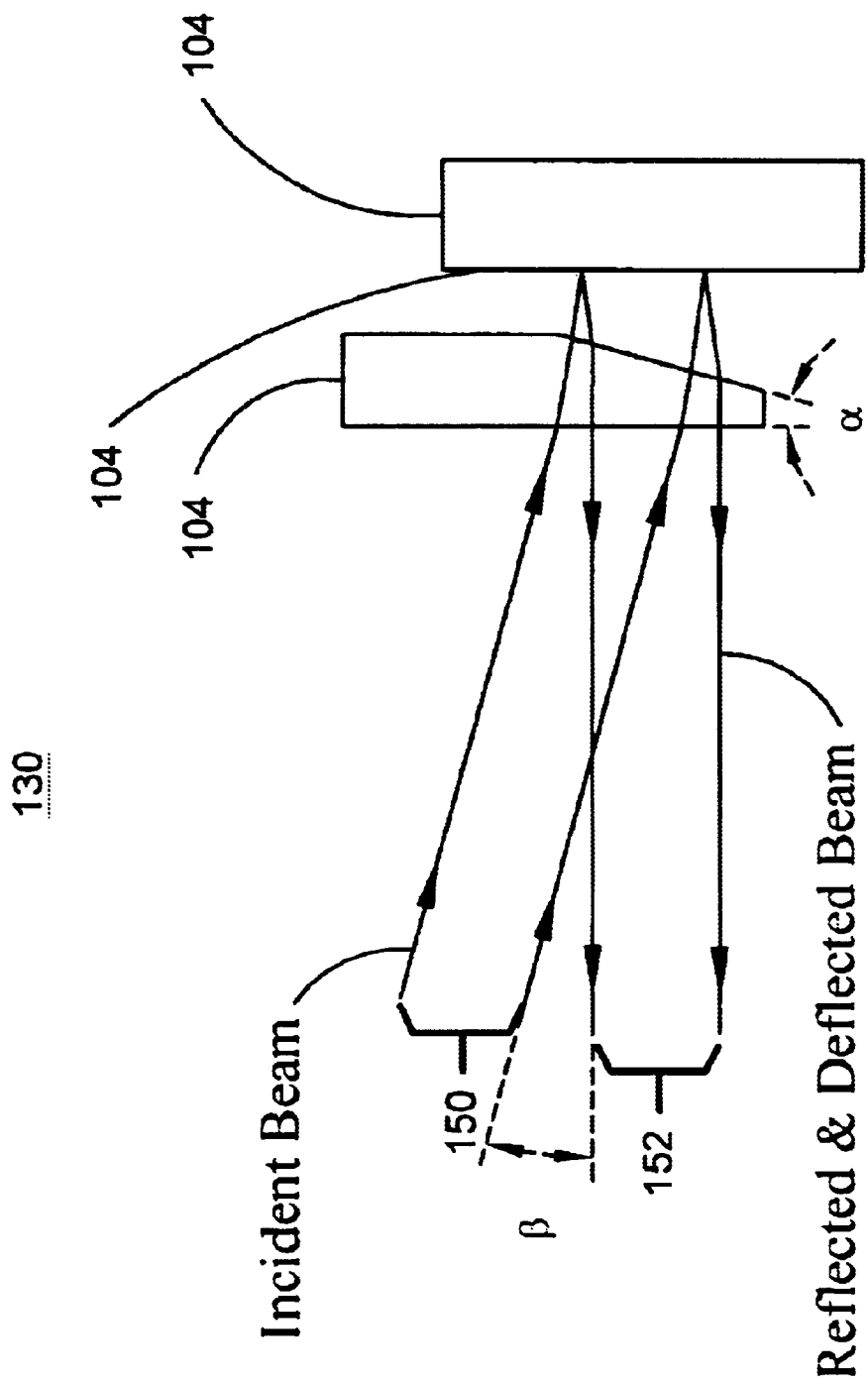
FIG. 5 is a diagram of one embodiment of a portion of the optical switch in accordance with the present invention depicting the beam separation and beam deflector angles.

FIG. 5 is a diagram of one embodiment of a portion of the optical switch 100 in accordance with the present invention depicting the beam separation and the beam deflector 120. The beam deflector 120 includes a first portion 122 and a second portion 124. The first portion 122 has faces which are parallel. The second portion 124 of the beam deflector 120 has faces which are angled with respect to each other. The angle between the faces is α, and is related to the beam separation angle, β, by the following equation:

$$\beta = \sin^{-1}\{n \cdot \sin(\alpha - (1/n)\sin^{-1}[\sin(2\alpha) - \sin^{-1}(n \cdot \sin \alpha)]\} \quad (1)$$

where n is the index of refraction of the beam deflector 120. In addition, the crossing distance of the triple fiber collimator, L, described above satisfies the following relationship:

$$L > t_{BD}/n + d \quad (2)$$

where d is the distance between the mirror 130 and the back surface of the beam deflector 120 and $t_{BD}$ is the thickness of the parallel portion of the beam deflector 120.

Figure 6:
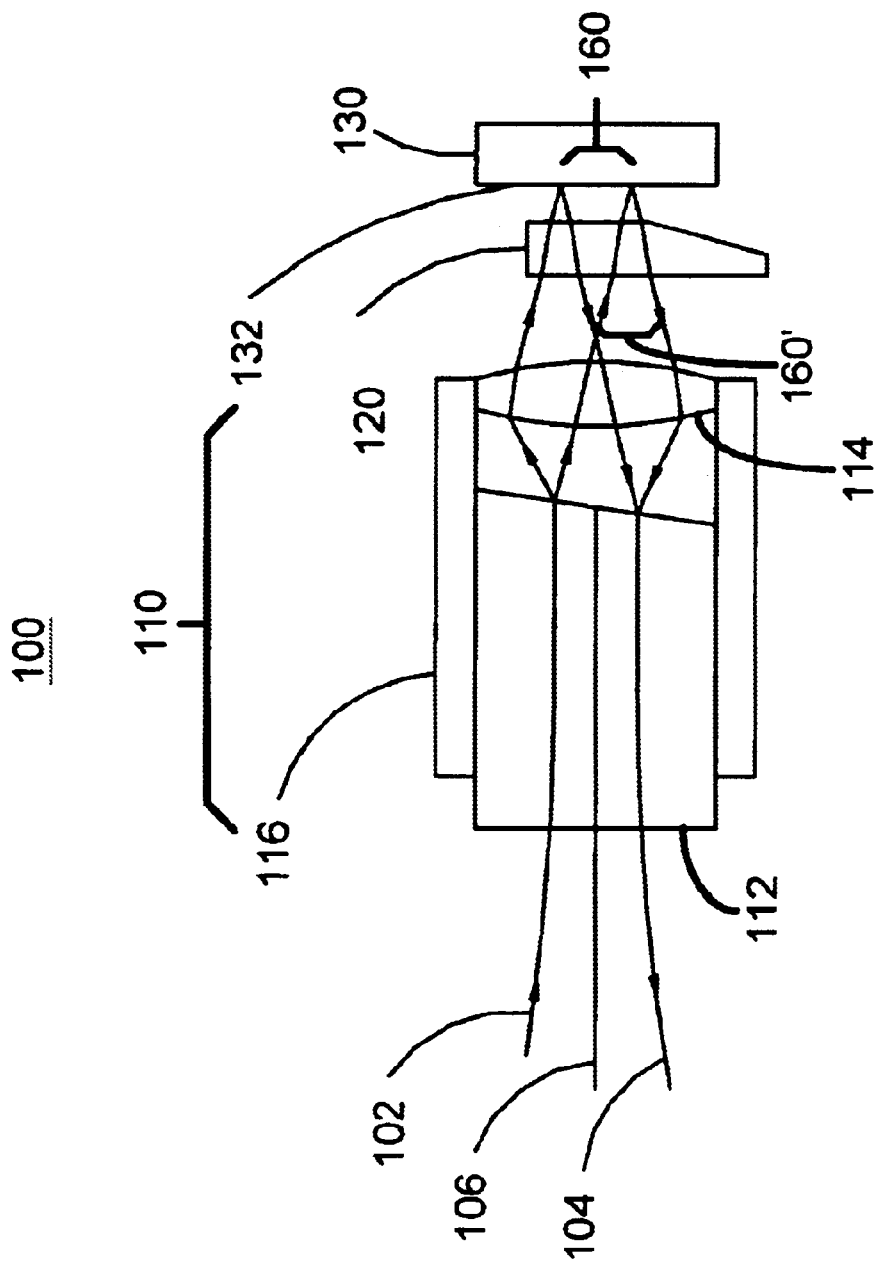
FIG. 6 is a diagram of one embodiment of the optical switch in accordance with the present invention in a first configuration.
Figure 7:
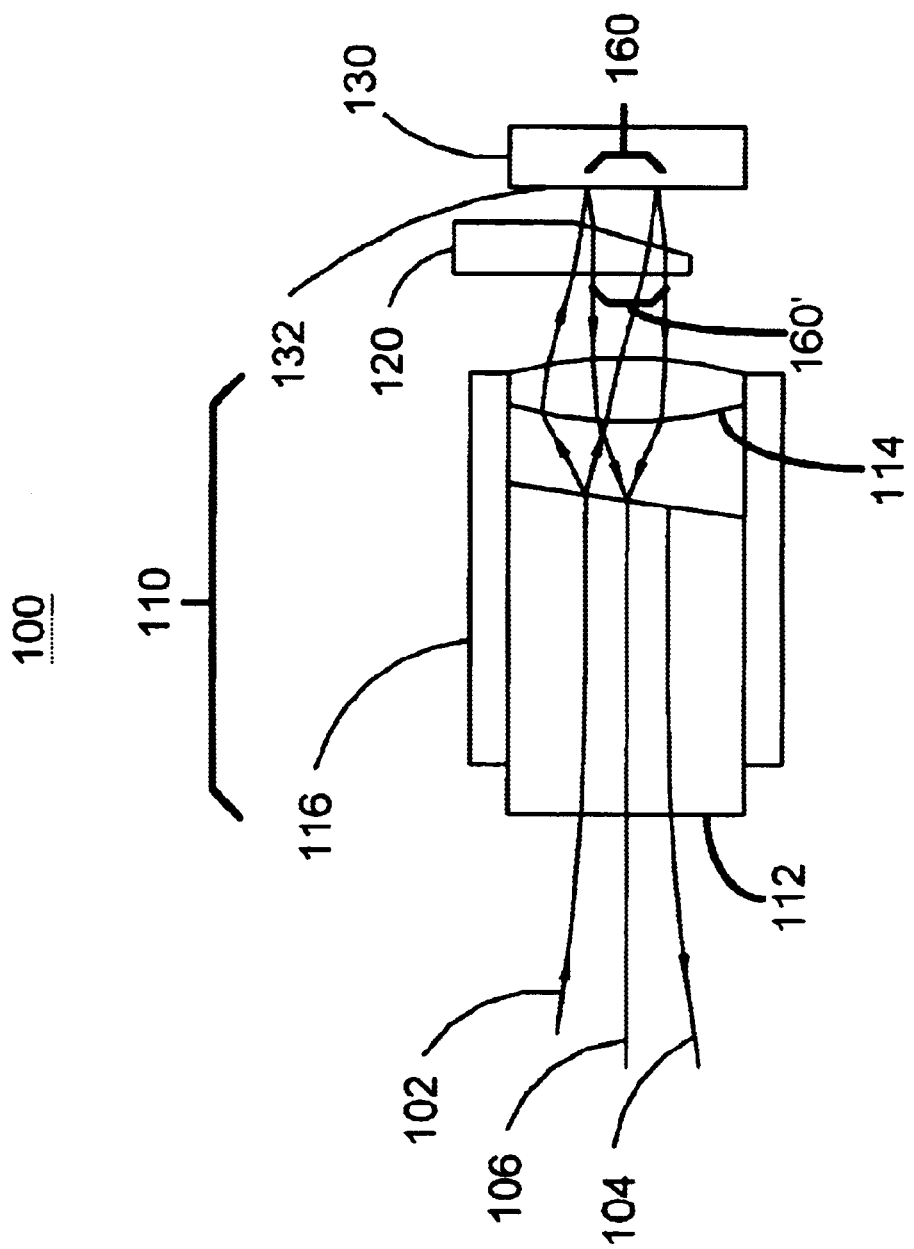
FIG. 7 is a diagram of one embodiment of the optical switch in accordance with the present invention in a second configuration.

Depending on whether the optical signal passes through the first portion 122 or the second portion 124 of the beam deflector 120, the optical signal is passed to the mirror 130, reflected and transmitted back to a different fiber 104 or 106. Thus, the beam deflector 120 has two positions in the optical switch 100, resulting in two different configurations and the optical signal input through the fiber 102 being transmitted to either the fiber 104 or the fiber 106. FIGS. 6 and 7 further explicate operation of the optical switch 100.

FIG. 6 is a diagram of one embodiment of the optical switch 100 in accordance with the present invention in a first configuration. In this configuration, the beam deflector 120 is positioned such that an optical signal input over the fiber 102 and collimated by the triple fiber collimator 110 will be transmitted through the first portion 122 of the beam deflector 120. The optical signal 160 is transmitted by the first portion 122 of the beam deflector 120 without deflection. The optical signal 160 is then totally reflected by the high reflective coating 132 of the mirror 130. The reflected optical signal 160' is again transmitted by the first portion 122 of the beam deflector 120 (albeit in the opposite direction). The reflected optical signal 160' is again transmitted without deflection by the first portion 122 of the beam deflector 120. The reflected optical signal 160' is then focused by the lens 114 such that the reflected optical signal 160' is provided to the fiber 104 to be output.

FIG. 7 is a diagram of one embodiment of the optical switch 100 in accordance with the present invention in a second configuration. In this configuration, the beam deflector 120 is positioned such that an optical signal input over the fiber 102 and collimated by the triple fiber collimator 110 will be transmitted through the second portion 124 of the beam deflector 120. The optical signal 160 is transmitted by the second portion 124 of the beam deflector 120 with an angular deflection in the counter clockwise direction, as viewed in FIG. 7. The transmitted optical signal 160 is then reflected by the high reflective coating 132 of the mirror 130. The reflected optical signal 160' is again transmitted by the second portion 124 of the beam deflector 120 (albeit in the opposite direction) with an angular deflection in the clockwise direction. The reflected optical signal 160' is then focused by the lens 114 such that the reflected optical signal 160' is provided to the fiber 106 to be output.

Thus, based upon the position of the beam deflector 120, the optical signal input via the fiber 102 is output to either the fiber 104 or the fiber 106. The optical switch 100 has a much larger tolerance for misalignments of the beam deflector 120. In particular, the precision of the angular alignment for the optical switch 100 is approximately two hundred times less than that of the conventional optical switch 10. For example, in a preferred embodiment, an angular misalignment of the beam deflector 120 of ±1.0° results in less than a ±0.01° misalignment for the deflected optical signal. Thus, a misalignment of the beam deflector 120 results in almost no additional insertion loss increment. Thus, the optical switch 100 is more insensitive to misalignments of the moving parts. As a result, the optical switch 100 has improved mechanical stability and reliability. Moreover, because the optical switch 100 has looser angular alignment tolerances on the moving parts, the beam deflector 120, assembly is simpler and easier. Because of the configuration of the optical switch 100, the optical switch 100 is compact, having a smaller footprint. Moreover, the optical switch 100 has fibers 102, 104 and 106 on a single side. As a result, the management of fibers 102, and 106 is simpler. In addition, the optical switch 100 uses fewer and lower cost optical components, such as a C-lens, and therefore is less expensive than a conventional optical switch.

A method and system has been disclosed for an optical switch. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. An optical switch comprising:
   a triple fiber collimator for receiving an optical signal from a first fiber and outputting the optical signal to a second fiber or a third fiber;
   a beam deflector having a first portion and a second portion; and a reflector, the beam deflector residing between the reflector and the triple fiber collimator;
   wherein the optical signal travels through the first portion of the beam deflector, is reflected by the reflector and is output over the second fiber when the beam deflector is in a first position;
   and wherein the optical signal travels through the second portion of the beam deflector, is reflected by the reflector and is output over the third fiber when the beam deflector is in a second position;
   and wherein the optical signal has a beam separation angle between a beam incident upon the reflector and a beam reflected by the reflector, and wherein the beam deflector has an index of refraction (n) and a first angle ($\alpha$), wherein the beam separation angle, ($\beta$) and a first angle ($\alpha$) of the beam deflector obey the relationship $\beta = \sin^{-1}(n \cdot \sin\{\alpha - (1/n)\sin^{-1}[\sin(2\alpha - \sin^{-1}(n \cdot \sin \alpha))]\})$.

2. The optical switch of claim 1 wherein the reflector is a mirror having a high reflective coating.

3. The optical switch of claims 1 wherein the first portion of the beam deflector includes a first side and a second side parallel to the first side, the optical signal traveling through the first side and the second side when the beam deflector is in the first position.

4. The optical switch of claim 3 wherein the second portion of the beam deflector includes a third side and a fourth side, the third side is at a first angle from the fourth side, the optical signal traveling through the third side and the fourth side when the beam deflector is in the second position, optical signal having a beam separation angle between a beam incident upon the reflector and a beam reflected by the reflector.

5. The optical switch of claim 1 wherein the triple fiber collimator has a crossing distance, the crossing distance being greater than a thickness of the beam deflector divided by an index of refraction of the beam deflector plus the distance between a back of the beam deflector and the reflector.

6. The optical switch of claim 1 wherein the triple fiber collimator is a C-lens or an aspherical lens triple fiber collimator.

7. An optical switch comprising:
   a triple fiber collimator for receiving an optical switch from a first fiber and outputting the optical signal to a second fiber or a third fiber;
   a beam deflector having a first portion and a second portion;
   a reflector, the beam deflector residing between the reflector and the triple fiber collimator;
   wherein the optical signal travels through the first portion of the beam deflector, is reflected by the reflector and is output over the second fiber when the beam deflector is in a first position;
   wherein the optical signal travels through the second portion of the beam deflector, is reflected by the reflector and is output over the third fiber when the beam deflector is in a second position;
   wherein the first portion of the beam deflector includes a first side and a second side parallel to the first side, the optical signal traveling through the first side and the second side when the beam deflector is in the first position;
   wherein the second portion of the beam deflector includes a third side and a fourth side, the third side is at a first angle from the fourth side, the optical signal traveling through the third side and the fourth side when the beam deflector is in the second position, optical signal having a beam separation angle between a beam incident upon the reflector and a beam reflected by the reflector;
   wherein the beam deflector has an index of refraction (n) and wherein the beam separation angle, ($\beta$) and the first angle ($\alpha$) obey the relationship:

$$\beta = \sin^{-1}(n \cdot \sin\{\alpha - (1/n)\sin^{-1}[\sin(2\alpha - \sin^{-1}(n \cdot \sin \alpha))]\}).$$

8. A method for switching an optical signal, the method comprising the steps of:
   (a) inputting the optical signal to a triple fiber collimator via a first fiber;
   (b) providing the optical signal from the triple fiber collimator a beam deflector having a first portion and a second portion;
   (c) providing the optical signal from the beam deflector to a reflector used to provide a reflected optical signal, the optical signal and the reflected optical signal traveling through the first portion of the beam deflector and being output over the second fiber when the beam deflector is in a first position, the optical signal and the reflected optical signal traveling through the second portion of the beam deflector and being output over the third fiber when the beam deflector is in a second position;
   and wherein the optical signal has a beam separation angle between a beam incident upon the reflector and a beam reflected by the reflector, and wherein the beam deflector has an index of refraction (n) and a first angle ($\alpha$), wherein the beam separation angle, ($\beta$) and a first angle ($\alpha$) of the beam deflector obey the relationship:

$$\beta = \sin^{-1}(n \cdot \sin\{\alpha - (1/n)\sin^{-1}[\sin(2\alpha - \sin^{-1}(n \cdot \sin \alpha))]\}).$$

9. The method of claim 8 wherein the reflector is a mirror having a high reflective coating.

10. The method of claim 8 wherein the first portion of the beam deflector includes a first side and a second side parallel to the first side, the optical signal traveling through the first side and the second side when the beam deflector is in the first position.

11. The method of claim 10 wherein the second portion of the beam deflector includes a third side and a fourth side, the third side is at a first angle from the fourth side, the optical signal traveling through the third side and the fourth side when the beam deflector is in the second position, optical signal having a beam separation angle between a beam incident upon the reflector and a beam reflected by the reflector.

12. The method of claim 8 wherein the triple fiber collimator has a crossing distance, the crossing distance being greater than a thickness of the beam deflector divided by an index of refraction of the beam deflector plus the distance between a back of the beam deflector and the reflector.

13. The method of claim 8 wherein the triple fiber collimator is a C-lens or an aspherical lens triple fiber collimator.

14. A method for switching an optical signal, the method comprising the steps of:

(a) inputting the optical signal to a triple fiber collimator via a first fiber;

(b) providing the optical signal from the triple fiber collimator a beam deflector having a first portion and a second portion;

(c) providing the optical signal from the beam deflector to a reflector used to provide a reflected optical signal, the optical signal and the reflected optical signal traveling through the first portion of the beam deflector and being output over the second fiber when the beam deflector is in a first position, the optical signal and the reflected optical signal traveling through the second portion of the beam deflector and being output over the third fiber when the beam deflector is in a second position;

wherein the second portion of the beam deflector includes a third side and a fourth side, the third side is at a first angle from the fourth side, the optical signal traveling through the third side and the fourth side when the beam deflector is in the second position, optical signal having a beam separation angle between a beam incident upon the reflector and a beam reflected by the reflector;

wherein the first portion of the beam deflector includes a first side and a second side parallel to the first side, the optical signal traveling through the first side and the second side when the beam deflector is in the first position;

wherein the beam deflector has an index of refraction (n) and wherein the beam separation angle, ($\beta$) and the first angle ($\alpha$) obey the relationship:

$$\beta = \sin^{-1}(n \cdot \sin\{\alpha - (1/n)\sin^{-1}[\sin(2\alpha - \sin^{-1}(n \cdot \sin \alpha))]\}).$$

* * * * *